United States Patent
Lu et al.

(10) Patent No.: US 11,288,856 B2
(45) Date of Patent: Mar. 29, 2022

(54) METHOD AND SYSTEM FOR WAVE PROPAGATION PREDICTION

(71) Applicant: INTELLIGENT FUSION TECHNOLOGY, INC., Germantown, MD (US)

(72) Inventors: Jingyang Lu, Germantown, MD (US); Yiran Xu, Germantown, MD (US); Dan Shen, Germantown, MD (US); Nichole Sullivan, Germantown, MD (US); Genshe Chen, Germantown, MD (US); Khanh Pham, Kirtland AFB, NM (US); Erik Blasch, Arlington, VA (US)

(73) Assignee: INTELLIGENT FUSION TECHNOLOGY, INC., Germantown, MD (US)

( * ) Notice: Subject to any disclaimer, the term of this patent is extended or adjusted under 35 U.S.C. 154(b) by 8 days.

(21) Appl. No.: 16/674,929

(22) Filed: Nov. 5, 2019

(65) Prior Publication Data
US 2021/0134046 A1 May 6, 2021

(51) Int. Cl.
*G06T 15/06* (2011.01)
*G06N 20/00* (2019.01)
*G06N 5/04* (2006.01)

(52) U.S. Cl.
CPC ............... *G06T 15/06* (2013.01); *G06N 5/04* (2013.01); *G06N 20/00* (2019.01)

(58) Field of Classification Search
CPC ........... G06T 15/06; G06N 5/04; G06N 20/00
See application file for complete search history.

(56) References Cited

U.S. PATENT DOCUMENTS

| 6,777,684 | B1 * | 8/2004 | Volkov | G01N 21/3581 250/341.1 |
| 9,331,767 | B1 * | 5/2016 | Thomas | H04B 7/0421 |
| 9,806,789 | B2 * | 10/2017 | Khan | H01Q 21/061 |

(Continued)

OTHER PUBLICATIONS

Segun I. Popoola; Determination of Neural Network Parameters for Path Loss Prediction in Very High Frequency Wireless Channel; IEEE Access (vol. 7); Oct. 11, 2019; pp. 150462-150483 (Year: 2019).*

(Continued)

*Primary Examiner* — Michael Le
(74) *Attorney, Agent, or Firm* — Anova Law Group, PLLC (57) ABSTRACT

The present disclosure provides a method for wave propagation prediction based on a 3D ray tracing engine and machine-learning based dominant ray selection. The method includes receiving, integrating, and processing input data. Integrating and processing the input data includes dividing a cone of the original millimeter wave (mmWave) into a plurality of sub cones; determining a contribution weight of rays coming from each sub cone to the received signal strength (RSS) at a receiving end of interest; and determining rays coming from one or more sub cones that have a total contribution weight to the RSS larger than a preset threshold value as dominant rays using a neural network obtained through a machine learning approach. The method further includes performing ray tracing based on the input data and the dominant rays to predict wave propagation.

19 Claims, 7 Drawing Sheets

(56) References Cited

U.S. PATENT DOCUMENTS

| | | | | |
|---|---|---|---|---|
| 10,571,925 | B1* | 2/2020 | Zhang | G05D 1/0246 |
| 2009/0096789 | A1* | 4/2009 | Peterson | G06T 15/06 |
| | | | | 345/426 |
| 2009/0128562 | A1* | 5/2009 | McCombe | G06T 15/06 |
| | | | | 345/427 |
| 2011/0287778 | A1* | 11/2011 | Levin | H04W 64/006 |
| | | | | 455/456.1 |
| 2014/0333623 | A1* | 11/2014 | Ozdas | G06T 15/08 |
| | | | | 345/426 |
| 2015/0201368 | A1* | 7/2015 | Cudak | H04W 48/12 |
| | | | | 370/329 |
| 2018/0102858 | A1* | 4/2018 | Tiwari | H04L 67/18 |
| 2019/0104549 | A1* | 4/2019 | Deng | H04W 74/0833 |
| 2019/0253900 | A1* | 8/2019 | Narasimha | H04W 16/28 |

OTHER PUBLICATIONS

M.Kobal; A thinning method using weight limitation for air-shower simulations; Pierre Auger Collaboration; Astroparticle Physics 15 (2001) 259-273. (Year: 2001).*

Segun I. Popoola; Determination of Neural Network Parameters for Path Loss Predictionin Very High Frequency Wireless Channel; IEEEAccess (vol. 7); Oct. 11, 2019; pp. 150462-150483 (Year: 2019).*

* cited by examiner

METHOD AND SYSTEM FOR WAVE PROPAGATION PREDICTION

GOVERNMENT RIGHTS

This invention was made with Government support under Contract No. W31P4Q-17-C-0087, awarded by the United States Army. The U.S. Government has certain rights in this invention.

FIELD OF THE DISCLOSURE

The present disclosure relates generally to the technical field of wireless communication, and more particularly, to a method and a system for wave propagation prediction based on a 3D ray tracing engine and machine-learning based dominant ray selection.

BACKGROUND

The wide popularity of smartphones and tablets is triggering an explosive growth of mobile applications and data traffic. Therefore, there is an increasing demand for mobile network with higher capacity. The mmWave spectrum offers a great opportunity to increase the network capacity. While the mmWave spectrum is primarily used for satellite communications and military applications, little is known about the channel propagation characteristics (e.g., the multipath effects) within urban environments at related carrier frequencies.

Conventional approaches for representing mmWave multipath effect are mainly based on statistical models, and to build the statistical models, a parameterization process has to be carried out based on experimental data. The statistical models only characterize the environments from which the statistics are generated. Therefore, the characterization is neither suitable for generalization nor tolerable to environmental changes. Besides, these statistics need field measurement campaigns and storage for these statistics, which requires a lot of resources.

To overcome the shortcomings of the aforementioned models, the physical model-based technique emerges as a promising approach to simulate and represent multipath effects properly and efficiently within actual urban environments. For example, deterministic models directly derived from the Maxwell's equations, including models based on the finite-difference time-domain technique and the finite element method, are highly accurate.

However, massive computational loads and intensive complexity make the utilization of such deterministic models impractical in most large-scale and complicated environments. For example, to achieve the Received Signal Strength (RSS) prediction based on ray-optical algorithms, determination of all the relevant paths from the transmitter to the receiver can be extremely time-consuming.

Further, the environment of wave propagation varies in different terrain, building, atmosphere, and vegetation conditions. Machine learning approach is utilized to take advantage of the environmental variability to intelligently determine the dominant rays. Accordingly, the overall computing efficiency may be significantly improved.

BRIEF SUMMARY OF THE DISCLOSURE

This disclosure provides an overall 3D intelligent ray tracing engine system of which the main module includes dominant rays selection, RSS prediction, and multipath effect determination.

One aspect or embodiment of the present disclosure includes a method for wave propagation prediction based on a 3D ray tracing engine and machine-learning based dominant ray selection. The method includes receiving input data, and integrating and processing the input data. Integrating and processing the input data further includes dividing a cone of an original millimeter wave (mmWave) into a plurality of sub cones; determining a contribution weight of rays coming from each sub cone to the received signal strength (RSS) at a receiving end of interest; and determining rays coming from one or more sub cones that have a total contribution weight to the RSS larger than a preset threshold value as dominant rays using a neural network obtained through a machine learning approach. The total contribution weight of rays coming from the plurality of sub cones is 1. The method further includes performing ray tracing based on the input data and the dominant rays to predict wave propagation.

One aspect or embodiment of the present disclosure includes a system for wave propagation prediction. The system includes an input device, configured to receive input data; and a dominant ray selector, configured to integrate and process the input data, including dividing cone of an original mmWave into a plurality of sub cones, determining a contribution weight of rays coming from each sub cone to the RSS at a receiving end of interest, and determining rays coming from one or more sub cones that have a total contribution weight to the RSS larger than a preset threshold value as dominant rays using a neural network obtained through a machine learning approach. The total contribution weight of rays coming from the plurality of sub cones is 1. The system further includes a 3D ray tracing engine, configured to perform ray tracing based on the input data and the dominant rays to predict wave propagation.

Other aspects or embodiments of the present disclosure can be understood by those skilled in the art in light of the description, the claims, and the drawings of the present disclosure.

DETAILED DESCRIPTION

Reference will now be made in detail to exemplary embodiments of the disclosure, which are illustrated in the accompanying drawings. Wherever possible, the same reference numbers will be used throughout the drawings to refer to the same or like parts.

Figure 1:
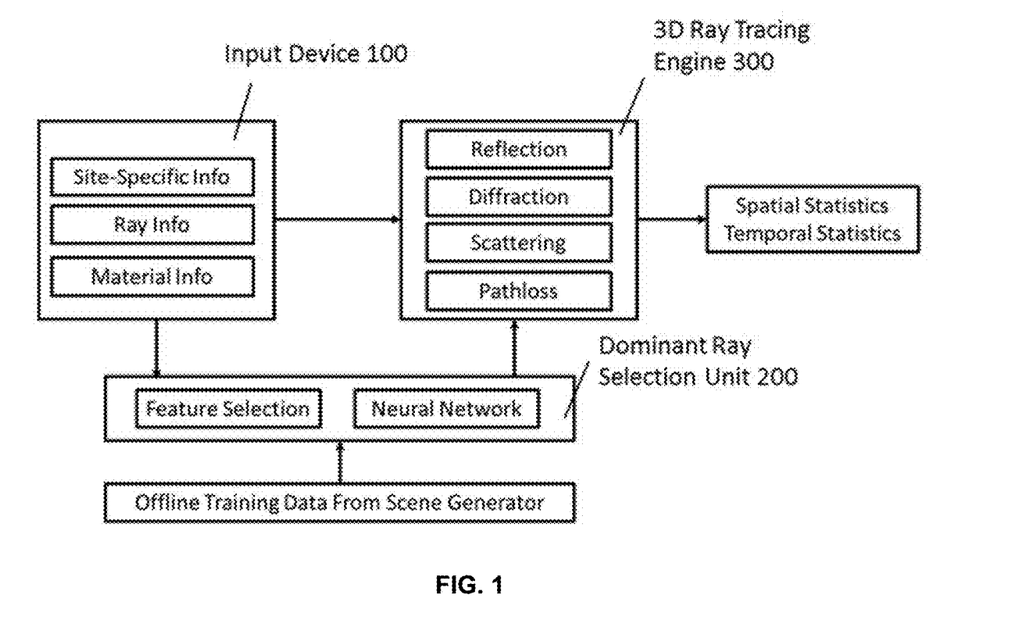
FIG. 1 illustrates an intelligent 3D ray tracing engine system, in which a machine learning approach is utilized to select dominant rays to improve the efficiency of the system, according to some embodiments of the present disclosure.

FIG. 1 illustrates a flow chart of a 3D ray tracing engine-based system for predicting wave propagation. As shown in FIG. 1, the system for evaluating a multipath effect may include an input device 100, a dominant ray selector 200, and a 3D ray tracing device including a 3D ray tracing engine 300. The input device 100 may be configured to receive input data, and the input data may include, for example, site-specific information, ray information, and material information. The dominant ray selector 200 is configured to integrate and process the input data.

For example, based on offline training data which includes coordination of the surrounding buildings, material of each buildings, emitting angle of transmitter, etc., generated from the scene generator, the dominant ray selector 200 may apply a machine learning approach to generate a selection result. The selection result may include dominant ray information, i.e., information of dominant rays that contribute most to the multipath effect at a target and its surrounding area. In some embodiments, the machine learning approach may include a feature selection process and a neural network process. That is, different local scenes may be analyzed and classified based on their features to obtain local scene information. Further, the local scene information may be applied for training purposes.

The 3D ray tracing engine 300 may be built based on a GPU, and may be configured to receive the input data from the input device 100 and the selection result from the dominant ray selector 200, to implement a ray-tracing computation. That is, the 3D ray tracing engine 300 may, based on site-specific information, ray information, material information, and the dominant ray information, perform ray tracing. Further, the 3D ray tracing engine 300 may consider effects such as reflection, diffraction, diffuse scattering and path loss, and may output spatial statistical data and temporal statistical data, such as the power delay profile (PDP) and the heat map based on the received signal strengths.

Further, based on the narrow beam property of the mmWave, a dominant ray selection model may be established through a sub-cone division approach to provide incident angles of dominant rays to the 3D ray-tracing engine 300. In the dominant ray selection model, due to the narrow beam property of the mmWave, a small set of rays may contribute to the RSS at each receiving end. Herein, RSS is a measurement of the power present in a received radio signal. For example, the RSS may be measured at the received side and may be related to the transmitted signal strength, path loss and interference. Among the small set of rays, rays incoming from a specific direction may contribute most to the RSS at a specified receiving end, such rays are referred to and selected as "dominant rays".

Further, the selected dominant rays may be inputted to the 3D ray-tracing engine 300 to run ray-tracing simulations. Since the dominant rays significantly reduce the number of simulated rays in the 3D ray-tracing engine 300, the real-time ray-tracing simulation may become much more time efficient. Moreover, the 3D ray-tracing engine 300 can also generate training data to improve the prediction performance of the machine learning model.

Figure 2:
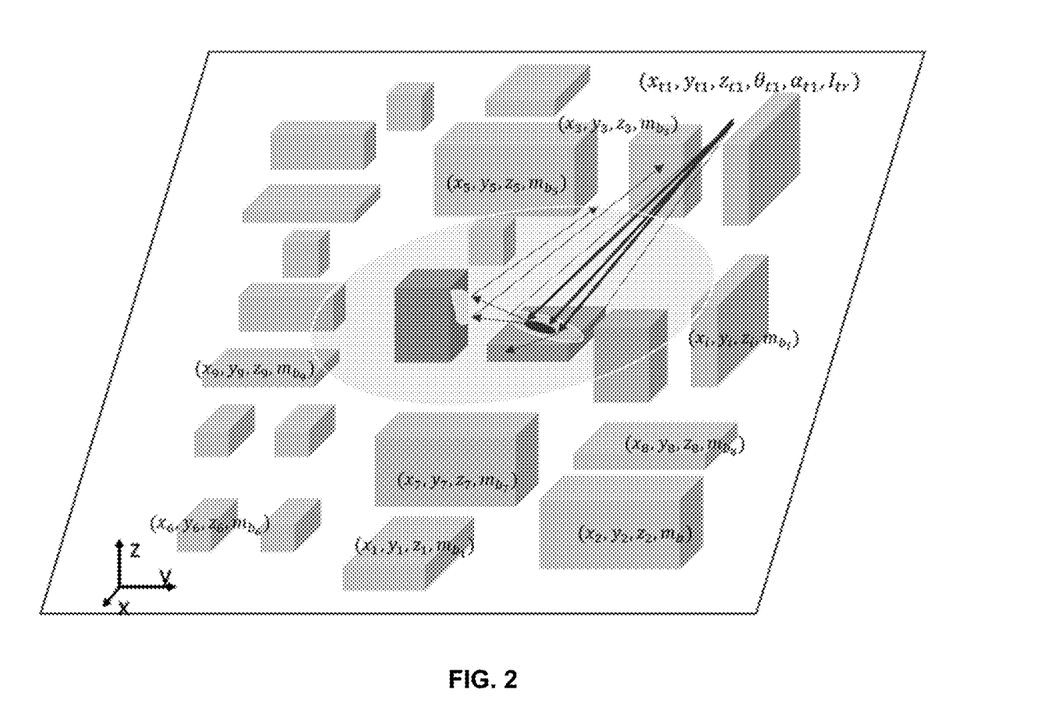
FIG. 2 illustrates a scenario in which dominant rays contribute most to the RSS, so that most of the rays can be neglected because of their small contribution to the receiving end of interest, according to some embodiments of the present disclosure.

FIG. 2 illustrates a complex 3D urban situation in which 3D ray tracing is performed. The complexity of the 3D urban situation may incur a higher computational burden. That is, to realize the 3D ray tracing, the RSS may need to be calculated for each individual ray, thereby generating a large computational burden. Based on the simulation result, the dominant rays may occupy 95% of the RSS at the receiving end. Therefore, finding and tracking only the dominant rays significantly reduces the computational burden while tracking the vast majority of the beam power. To this end, a machine learning based dominant ray determination approach is proposed.

Figure 3:
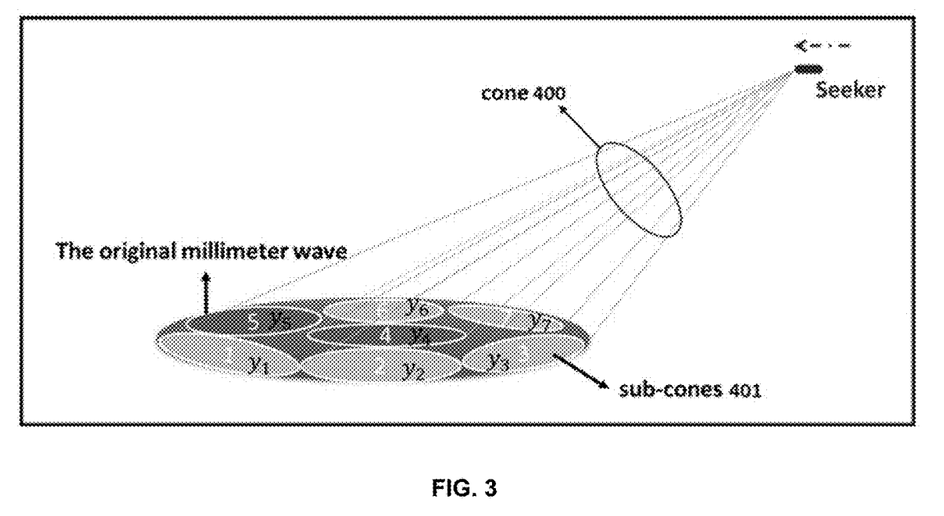
FIG. 3 depicts an exemplary sub-cone division approach that divides an original mmWave into a plurality of sub cones, in which a machine learning approach is deployed to determine dominant cones as dominant rays, according to some embodiments of the present disclosure.

FIG. 3 illustrates an exemplary sub-cone division approach. As shown in FIG. 3, a seeker may be included to server as a transmitter to generate millimeter wave signal characterized as cone 400. The cone 400 representing the original mmWave may be divided into a plurality of sub-cones 401 (y1~y7), and the RSS at the specified receiving end may be calculated. To obtain a higher accuracy for calculation of the RSS, the number of the sub-cones that the cone representing the original mmWave is divided into may be increased. That is, the more the sub-cones, the higher the accuracy for calculating the RSS. Further, each sub-cone may be assigned a weight, and the weight of each sub-cone can be calculated as below, $$w_i = \frac{\sum_{l_i=1}^{n_i} RSS_{i,l_i}}{\sum_{l=1}^{n} RSS_l}, i = 1 \ldots 7 \quad (1)$$

where n is the total number of sub-cones representing different rays, $RSS_l$ is the received signal strength of each ray, $n_i$ is the number of rays in the i-th sub-cone, $RSS_{i,l_i}$ is the received signal strength of each ray in the i-th sub-cone, and $w_i$ is the weight for the i-th sub-cone which satisfies the following condition:

$$\sum_{i=1}^{7} w_i = 1 \quad (2)$$

The challenge is to find the dominant sub-cones or dominant rays, so that the ray tracing engine does not need to calculate all the rays equally.

Figure 4:
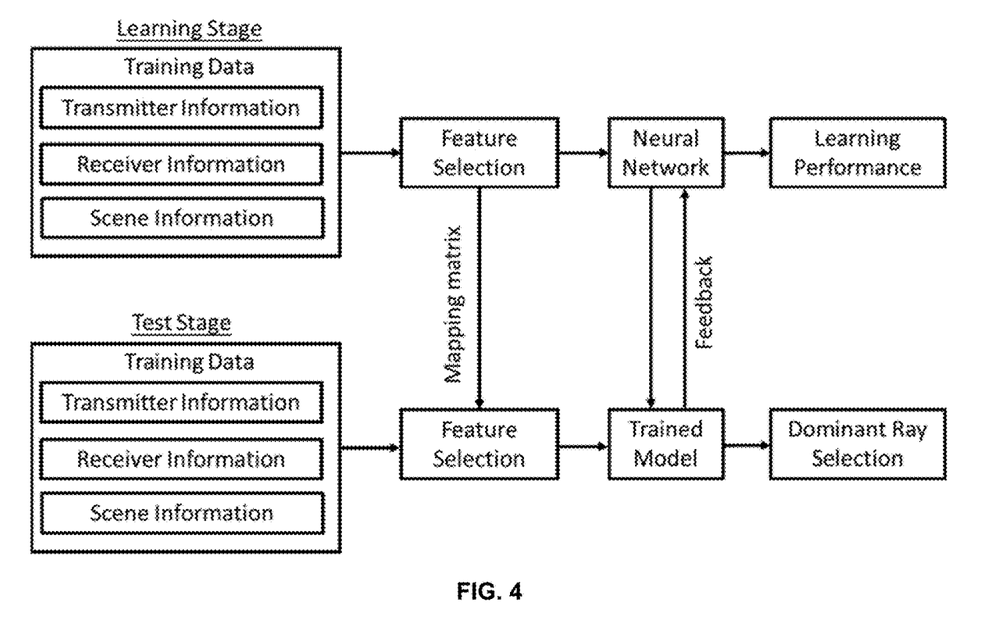
FIG. 4 depicts a flow chart of an exemplary machine learning approach to determine a weight of each sub cone, according to embodiments of the present disclosure.

FIG. 4 depicts a flow chart of a machine learning approach for dominant ray selection (i.e., determination of a weight of each sub cone). As shown in FIG. 4, the machining learning approach may include a learning stage and a test stage. In the learning stage, the aforementioned dominant ray selector 200 may receive the transmitter information, the receiver information, and the scene information, such as building materials, road type, etc. Further, the dominant ray selector 200 may perform a feature selection process to select the most relevant features. In the test stage, the selected features may be further classified to obtain a trained neural network for determining the dominant rays.

The well-trained neural network may serve as the core for dominant ray selection in the application stage.

Figure 5:
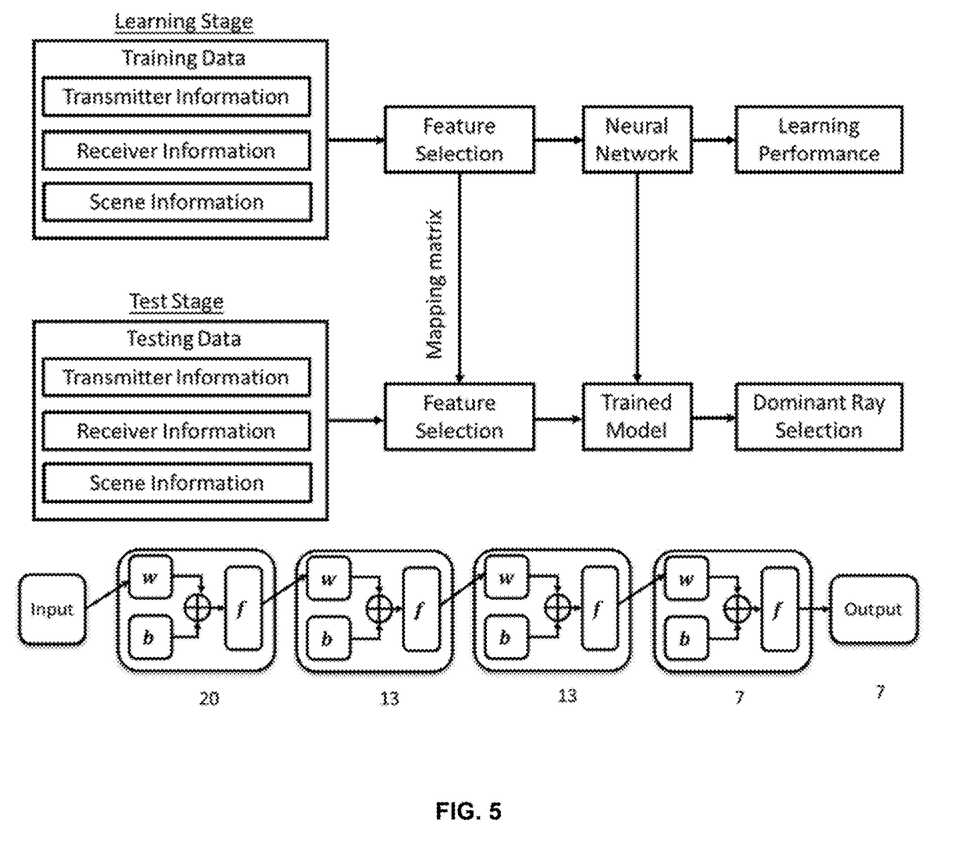
FIG. 5 depicts an exemplary four-layer neural network used in determining dominant rays according to some embodiments of the present disclosure.
Figure 6:
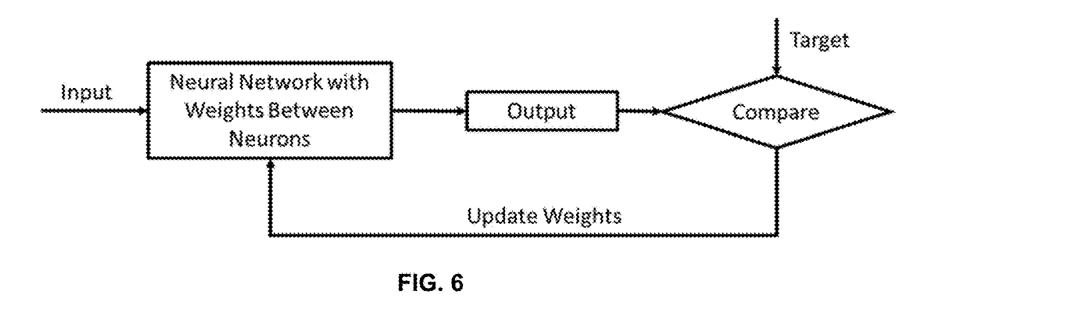
FIG. 6 depicts an exemplary training process for a neural network given training data representing environmental variability according to some embodiments of the present disclosure.

FIG. 5 depicts an exemplary four-layer neural network used in determining dominant rays according to some embodiments of the present disclosure. FIG. 6 depicts an exemplary training process for a neural network given training data representing environmental variability according to some embodiments of the present disclosure;

Neural networks have been utilized to perform complex functions in various fields of application such as pattern recognition, identification, and classification, etc. Referring to FIG. 5, a four-layer neural network is deployed to predict the sub-cone weights, so that dominant cones can be selected for the aforementioned 3D ray tracing engine 300. The number of neurons in each layer may be determined using a greedy search algorithm.

In FIG. 6, the four-layer neural network is trained, so that a particular input leads to a specific target output. The neural network may be adjusted, based on a comparison of the output and the target, until the network output matches the sub-cone weights.

Further, a plurality of input/target pairs may be used in the supervised learning to train the four-layer neural network. Batch training of a network may proceed by making weight and bias changes based on an entire set of input vectors. Incremental training, a.k.a. online training or adaptive training, may change the weights and biases of a network as needed after presentation of each individual input vector.

In the training process, 75% of data may be used for training, 15% of data may be used for test, and 10% of data may be used for validation. The training set here may be deployed to adjust the weights of the neural network. The validation set may be used to avoid overfitting.

Figure 7:
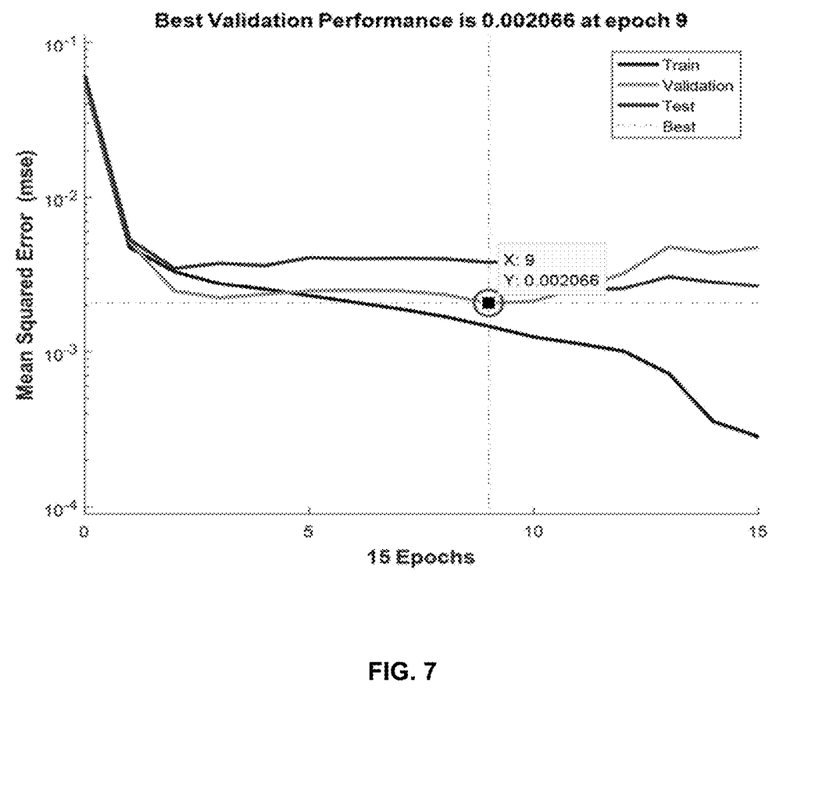
FIG. 7 depicts an exemplary training process result in terms of the mean squared error according to embodiments of the present disclosure.

FIG. 7 illustrates the investigation and analysis of the neural network model regarding the accuracy of RSS prediction. Firstly, the data set may consist of an input of size 10,000×41 and label values of size 10,000×7 representing the 7 sub-cones divided in FIG. 3.

Levenberg-Marquardt backpropagation may be used for updating the weight. The neural network performance is shown in FIG. 7. Referring to FIG. 7, at the epoch 9, the trained neural network obtains the smallest the estimation error which is 0.0021. Under the same experiment set up, support vector regression (SVR) is utilized, a Gaussian kernel is deployed, and the corresponding mean square is 0.0028.

Figure 8:
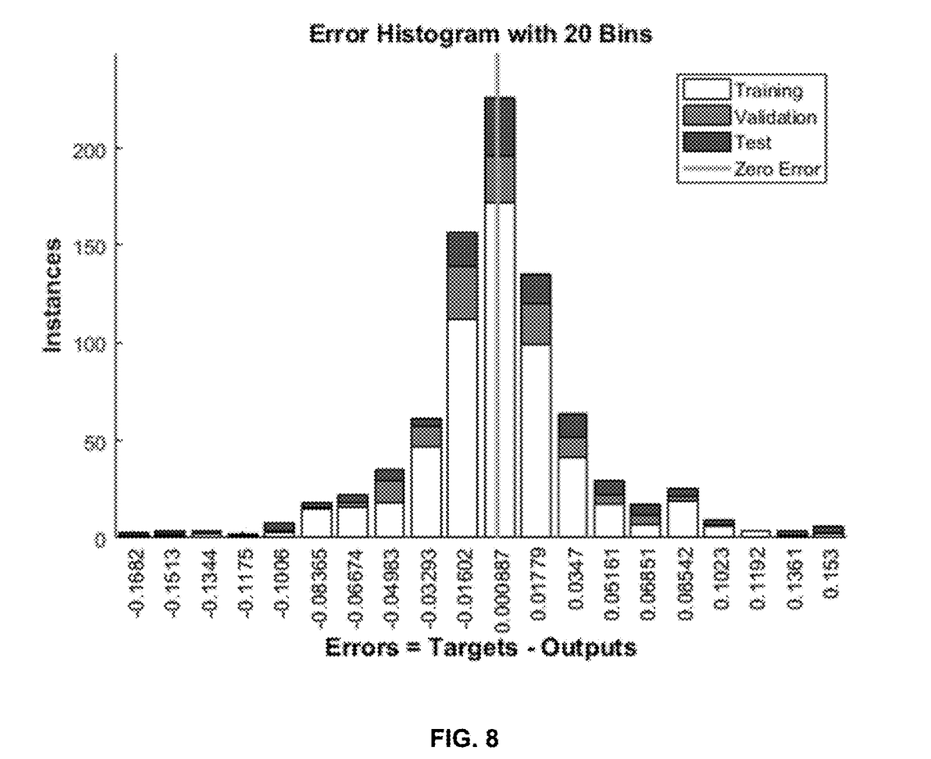
FIG. 8 depicts a performance of an exemplary trained neural network in the histogram, according to embodiments of the present disclosure.

FIG. 8 illustrates the corresponding error histogram in which the error between the label values and the prediction is denoted as err=y-ŷ. Referring to FIG. 8, the well trained neural network model is able to correctly predict the weight of each sub cone with a small estimation error, which provides beneficial basis for the RSS and multipath effect determination.

Figure 9:
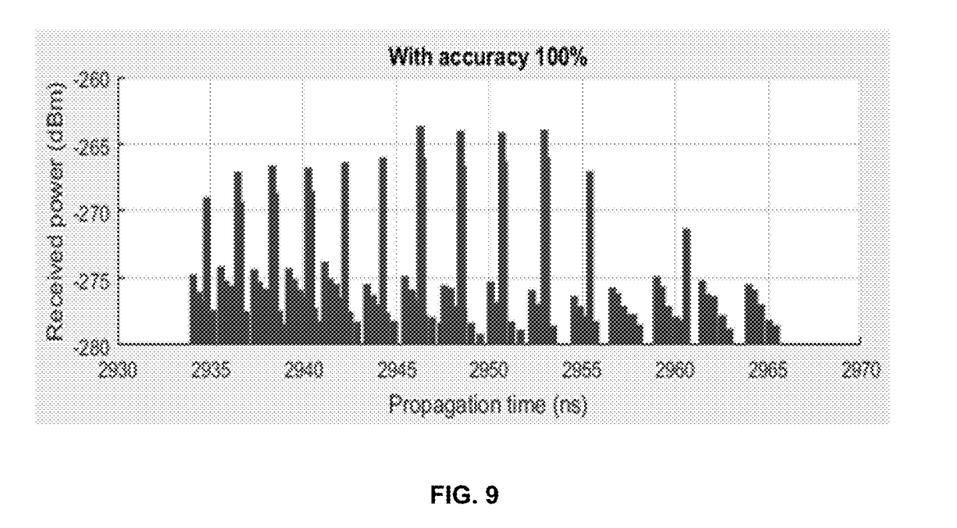
FIG. 9 depicts a multipath effect considering all rays of an original mmWave.

FIG. 9 illustrates the original ray tracing results without performing machine learning. The ray tracing process may start with 1080 rays in a typical urban environment. The beam cone may be divided into seven sub-cones by selecting sub-cones with more power, and adding them together to a certain power threshold as shown in Equation 3:

$$\sum_{i_x \in \{1,\ldots,7\}} w_{i_x} = P_T \quad (3)$$

where $P_T$ is a certain threshold for ray tracing simulation, and the least number x of sub cones are selected to satisfy Equation 3. The reduced number of rays may be necessary for computation, such that the ray tracing process can be processed much faster. The total computation time is 4.9 seconds.

Figure 10:
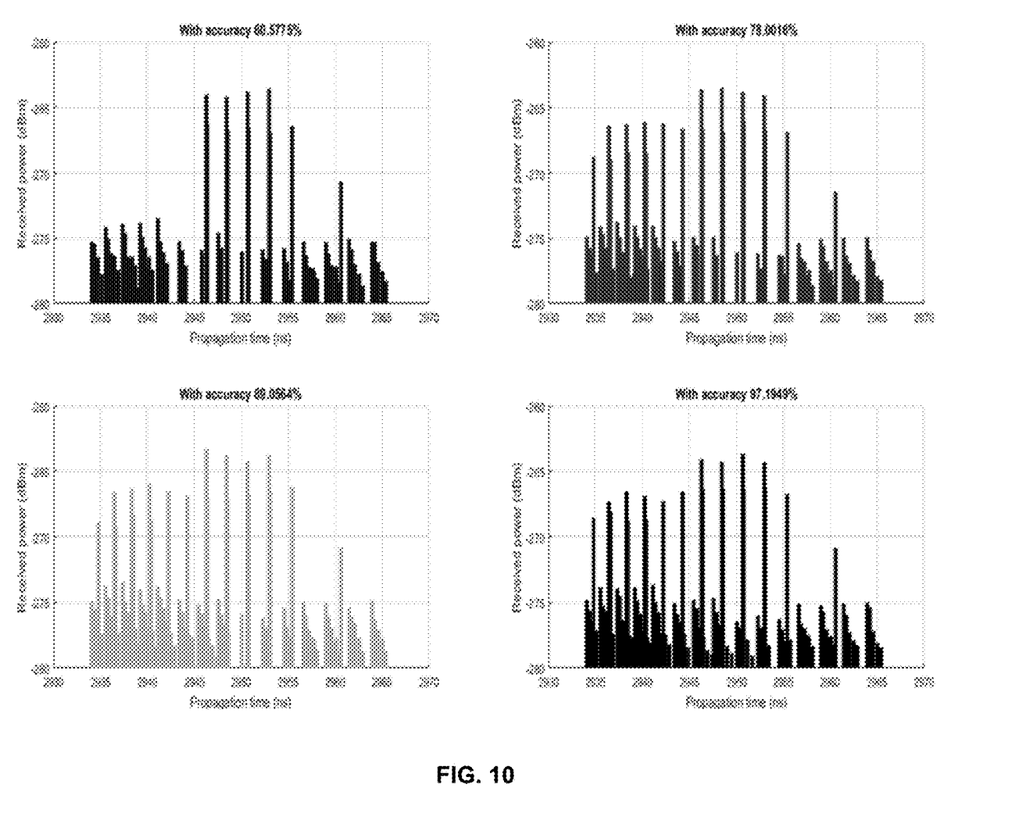
FIG. 10 depicts a multipath effect given different accuracy requirements according to embodiments of the present disclosure.

FIG. 10 illustrates the simulation results with machine learning. By adopting machine learning, dominant cones may be selected to process the ray tracing and thus reduce computation burden by sacrificing the calculation accuracy. Four simulations at different calculation accuracies are presented. For example, the simulation at 60% calculation accuracy may take 40% less computation time since only three out of the seven sub-cones are selected and they may occupy about 60% of the total power. As the number of sub-cones increases, the calculation accuracy may increase as well. The calculation accuracy 78%, 89%, 97% shown in FIG. 10 may be determined based on the sub-cone number 4, 5, 6, respectively. It turns out that these sub-cones can perform a very fast but less reliable ray tracing process (comparing to that shown in FIG. 9, a significant loss can be observed at first nanoseconds). However, in the simulation result at 78% accuracy, the main part of the whole signals and acceptable results can be obtained.

Figure 11:
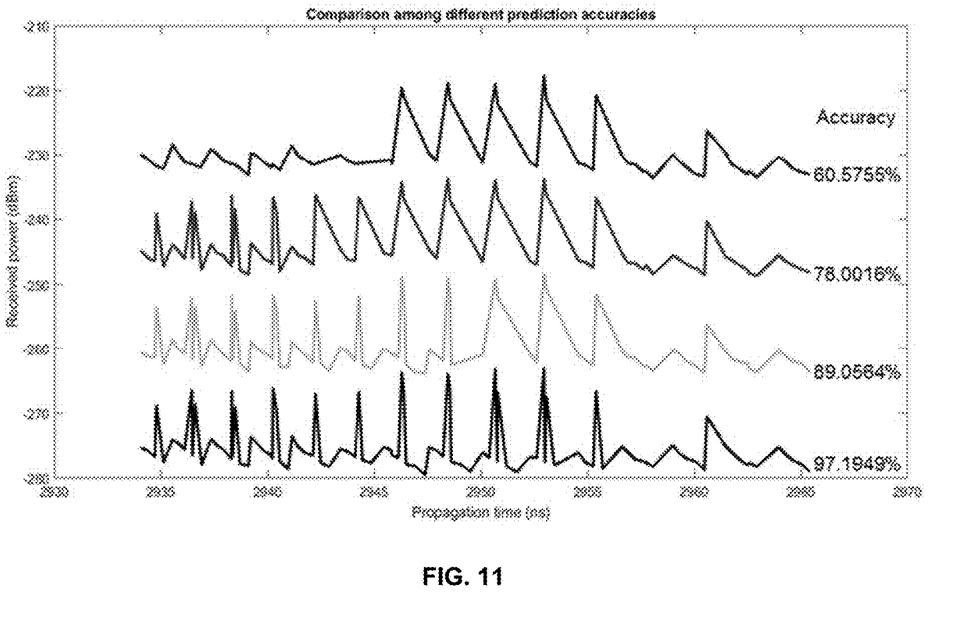
FIG. 11 depicts received power as a function of propagation time for different accuracy requirements according to some embodiments of the present disclosure.

FIG. 11 illustrates the comparison among simulations at different accuracy levels. At higher accuracies, more details are clarified as the comparison shown in FIG. 11. From 78% to 97% accuracy in FIG. 11, more detailed signals come into presence as the computation time increases. Namely, the computation time for 78% accuracy is 2.8 seconds and for 97% accuracy is 4.2 seconds.

According to the disclosed method and framework for a machine learning based 3D ray tracing engine model, the proposed machine learning based approach can take fully advantage of the transmitter, environment information and features of the mmWave to determine the dominant rays for the 3D ray tracing by improving the processing efficiency and predicting the multipath effect of the mmWave. Also, by investigating the similarities among the various local scenes, the training data covering different types of feature local scene efficiently improves the neural network based dominant ray selection model performance regarding the robustness, resilience, and adaptivity.

The above detailed descriptions only illustrate certain exemplary embodiments of the present invention, and are not intended to limit the scope of the present invention. Those skilled in the art can understand the specification as whole and technical features in the various embodiments can be combined into other embodiments understandable to those persons of ordinary skill in the art. Any equivalent or modification thereof, without departing from the spirit and principle of the present invention, falls within the true scope of the present invention.

What is claimed is:
1. A method for wave propagation prediction, comprising:
  obtaining input data, wherein the input data include transmitter information of a transmitter, receiver information of a receiver, and scene information;
  integrating and processing the input data, including:
    dividing a cone of an original millimeter wave (mmWave) into a plurality of sub cones, determining a contribution weight of rays coming from each sub cone contributed to received signal strength (RSS) at the receiver, by using a neural network obtained through a machine learning approach, based on the input data of the rays coming from each sub cone, and determining rays coming from one or more sub cones, among the plurality of sub cones, that have a total contribution weight to the RSS larger than a preset threshold value as dominant rays in the neural network obtained through the machine learning approach;

after the dominant rays are determined based on the one or more sub cones among the plurality of sub cones using the neural network obtained through the machine learning approach, performing ray tracing based on input data corresponding to the dominant rays to predict wave propagation with an increased computing efficiency;

wherein:

for determining the dominant rays, the machine learning approach includes a learning stage and a test stage, wherein:

the learning stage includes receiving the transmitter information, the receiver information, and the scene information, and performing a feature selection process to select relevant features; and the test stage includes classifying the selected relevant features to obtain the neural network for determining the dominant rays.

2. The method according to claim 1, wherein:
the input data includes site-specific information, ray information, and material information, of the transmitter and/or the receiver.

3. The method according to claim 1, wherein:
the RSS is a measurement of a power present in a received signal at the receiver.

4. The method according to claim 3, wherein:
the RSS is related to transmitted signal strength, path loss and interference, and is measured at the receiving end of interest.

5. The method according to claim 1, wherein:
to predict the wave propagation, reflection, diffraction, diffuse scattering, and path loss, of the dominant rays, are also considered when performing the ray tracing based on the input data corresponding to the dominant rays.

6. The method according to claim 1, further including:
outputting spatial statistical data and temporal statistical data.

7. The method according to claim 6, wherein:
the spatial statistical data and temporal statistical data includes power delay profile (PDP) and a heat map based on the RSS.

8. The method according to claim 1, further including:
generating training data to improve prediction performance of the machine learning approach.

9. The method according to claim 1, wherein:
a larger preset threshold value corresponds to a higher calculation accuracy when performing the ray tracing based on the input data corresponding to the dominant rays to predict the wave propagation.

10. The method according to claim 1, wherein:
the scene information includes environmental information related to the transmitter and the receiver, the environmental information including information of one or more of a terrain, a building, atmosphere, and vegetation conditions.

11. A system for wave propagation prediction, comprising:

an input device, configured to obtain input data, wherein the input data include transmitter information of a transmitter, receiver information of a receiver, and scene information;

a dominant ray selector, configured to integrate and process the input data, including:

dividing a cone of an original mmWave into a plurality of sub cones, determining a contribution weight of rays coming from each sub cone contributed to received signal strength (RSS) at the receiver, by using a neural network obtained through a machine learning approach, based on the input data of the rays coming from each sub cone, and determining rays coming from one or more sub cones, among the plurality of sub cones, that have a total contribution weight to the RSS larger than a preset threshold value as dominant rays in the neural network obtained through the machine learning approach; and a 3D ray tracing engine, configured, after the dominant rays are determined based on the one or more sub cones among the plurality of sub cones using the neural network obtained through the machine learning approach, to perform ray tracing based on input data corresponding to the dominant rays to predict wave propagation with an increased computing efficiency;

wherein:

for determining the dominant rays, the machine learning approach includes a learning stage and a test stage, wherein:

the learning stage includes receiving the transmitter information, the receiver information, and the scene information, and performing a feature selection process to select relevant features; and the test stage includes classifying the selected relevant features to obtain the neural network for determining the dominant rays.

12. The system according to claim 11, wherein:
the input data includes site-specific information, ray information, and material information, of the transmitter and/or the receiver.

13. The system according to claim 11, wherein:
the RSS is a measurement of a power present in a received signal at the receiver.

14. The system according to claim 13, wherein:
the RSS is related to transmitted signal strength, path loss and interference, and is measured at the receiving end of interest.

15. The system according to claim 11, wherein:
to predict the wave propagation, reflection, diffraction, diffuse scattering, and path loss, of the dominant rays, are also considered when the ray tracing is performed based on the input data corresponding to the dominant rays.

16. The system according to claim 11, wherein:
the 3D ray tracing engine is further configured to output spatial statistical data and temporal statistical data.

17. The system according to claim 16, wherein:
the spatial statistical data and temporal statistical data includes PDP and a heat map based on the RSS.

18. The system according to claim 11, wherein:
the 3D ray tracing engine is further configured to generate training data to improve prediction performance of the machine learning approach.

19. The system according to claim 11, wherein:
a larger preset threshold value corresponds to a higher calculation accuracy when the ray tracing is performed based on the input data corresponding to the dominant rays to predict the wave propagation.

* * * * *